(12) United States Patent
Kortmeyer et al.

(10) Patent No.: US 12,435,250 B2
(45) Date of Patent: Oct. 7, 2025

(54) DOUBLE PASS PROCESS OF MAKING A SELF ADHERING ROOFING MEMBRANE WITH IMPROVED ADHESION AT LOWER INSTALLATION TEMPERATURE

(71) Applicant: JOHNS MANVILLE, Denver, CO (US)

(72) Inventors: Jordan Kortmeyer, Parker, CO (US); Diego Pedrazzoli, Littleton, CO (US); Daniel Blasini, Lakewood, CO (US); Bradley Crume, Lakewood, CO (US)

(73) Assignee: Johns Manville, Denver, CO (US)

( * ) Notice: Subject to any disclaimer, the term of this patent is extended or adjusted under 35 U.S.C. 154(b) by 321 days.

(21) Appl. No.: 18/073,121

(22) Filed: Dec. 1, 2022

(65) Prior Publication Data

US 2023/0087595 A1 Mar. 23, 2023

Related U.S. Application Data

(62) Division of application No. 17/324,232, filed on May 19, 2021, now Pat. No. 11,549,037.

(51) Int. Cl.
*C09J 7/40* (2018.01)
*C09J 7/24* (2018.01)
*C09J 7/29* (2018.01)
*C09J 7/35* (2018.01)
*C09J 7/38* (2018.01)
*E04D 5/08* (2006.01)
*E04D 5/14* (2006.01)

(52) U.S. Cl.
CPC ............... *C09J 7/401* (2018.01); *C09J 7/243* (2018.01); *C09J 7/245* (2018.01); *C09J 7/29* (2018.01); *C09J 7/35* (2018.01); *C09J 7/383* (2018.01); *E04D 5/08* (2013.01); *E04D 5/148* (2013.01); *C09J 2301/122* (2020.08); *C09J 2301/208* (2020.08); *C09J 2301/304* (2020.08); *C09J 2301/416* (2020.08); *C09J 2409/00* (2013.01); *C09J 2423/006* (2013.01); *C09J 2423/166* (2013.01); *Y10T 428/14* (2015.01)

(58) Field of Classification Search
CPC .......................... C09J 7/401; C09J 2301/208; C09J 2301/416; E04D 5/148; Y10T 428/14
See application file for complete search history.

(56) References Cited

U.S. PATENT DOCUMENTS 4,855,172 A  8/1989 Chin
6,153,302 A * 11/2000 Karim .................... C09J 163/00
                                                      522/143
10,065,394 B2  9/2018 Tang et al.
(Continued)

FOREIGN PATENT DOCUMENTS

WO          9513315 A1   5/1995
WO    WO-2016130636 A1 * 8/2016

*Primary Examiner* — Daniel McNally
(74) *Attorney, Agent, or Firm* — Robert D. Touslee

(57) ABSTRACT

A self-adhering roofing membrane may include a polymeric membrane. The roofing membrane may include a first adhesive layer disposed on a major surface of the polymeric membrane. The first adhesive layer may include one or both of a hot melt adhesive and a butyl rubber-based adhesive. The roofing membrane may include a UV curable adhesive layer disposed on the first adhesive layer. The UV curable adhesive layer may have a thickness of less than about 4 mils.

20 Claims, 3 Drawing Sheets

(56) References Cited

U.S. PATENT DOCUMENTS

| | | | |
|---|---|---|---|
| 10,370,854 B2 | 8/2019 | Tang et al. | |
| 2010/0075092 A1* | 3/2010 | Kendra | C08L 53/02 |
| | | | 522/42 |
| 2014/0246090 A1* | 9/2014 | Weigel | H10F 19/80 |
| | | | 136/259 |

* cited by examiner

DOUBLE PASS PROCESS OF MAKING A SELF ADHERING ROOFING MEMBRANE WITH IMPROVED ADHESION AT LOWER INSTALLATION TEMPERATURE

CROSS REFERENCE TO RELATED APPLICATIONS

This application is a Division of pending U.S. application Ser. No. 17/324,232 filed May 19, 2021. The entire contents of the above-identified application are incorporated by reference for all purposes.

BACKGROUND

Conventional roofing membranes are often applied to roofing boards and/or other surfaces using adhesives, which may prevent the need to use any fasteners that would need to puncture the roofing membrane and which could lead to water ingress. However, while the adhesives used on conventional roofing membranes are often adequate to secure the roofing membrane to the roof, such adhesives typically have a small workable temperature range at which the adhesives remain tacky. In particular, conventional adhesives lose their tackiness at lower temperatures, which may limit the effectiveness of the roofing membrane and/or limit the installation of the roofing membranes to times when certain environmental conditions are present. Additionally, conventional adhesives tend to have low peel strengths and may exhibit cohesive failures over time. Therefore, improvements in roofing membranes are desired.

SUMMARY

In one embodiment, a self-adhering roofing membrane may include a polymeric membrane is provided. The roofing membrane may include a first adhesive layer disposed on a major surface of the polymeric membrane. The first adhesive layer may include one or both of a hot melt adhesive and a butyl rubber-based adhesive. The roofing membrane may include a UV curable adhesive layer disposed on the first adhesive layer. The UV curable adhesive layer may have a thickness of less than about 4 mils.

In some embodiments, a glass transition temperature of the UV curable adhesive may be less than about −20° C. The UV curable adhesive may exhibit a peel strength of at least 5 pounds per linear inch. A thickness of the first adhesive layer is between about 2 mils and 15 mils. The polymeric membrane may include one or more selected from a group comprising polyvinyl chloride (PVC), thermoplastic polyolefin (TPO), and ethylene propylene diene monomer (EPDM). The roofing membrane may include a release liner coupled with the UV curable adhesive layer. The release liner may include a UV blocking material.

In another embodiment, a self-adhering roofing membrane may include a polymeric membrane. The roofing membrane may include a first adhesive layer disposed on a major surface of the polymeric membrane. The roofing membrane may include a UV curable adhesive layer disposed on the first adhesive layer. The UV curable adhesive layer may have a thickness of less than about 4 mils.

In some embodiments, the UV curable adhesive layer may be only partially cured prior to installation. The UV curable adhesive may include between about 20% and 40% of a tackier resin, between about 0% and 15% of an initiator, and between about 45% and 80% of an acrylic resin. The self-adhering roofing membrane may remain tacky at temperatures as low as about 15° F. The first adhesive layer may include an additional UV curable adhesive. The polymeric membrane may be a single ply membrane.

In one embodiment, a method of manufacturing a self-adhering roofing membrane is provided. The method may include applying a first adhesive layer to a major surface of a polymeric roofing membrane. The method may include at least partially curing the first adhesive layer. The method may include applying a UV curable adhesive layer atop the at least partially cured first adhesive layer. The method may include exposing the UV curable adhesive to a UV light source to at least partially cure the UV curable adhesive layer. The method may include compressing the polymeric roofing membrane, the first adhesive layer, and the UV curable adhesive layer to form a self-adhering roofing membrane. After compression the UV curable adhesive layer may have a thickness of less than about 4 mils.

In some embodiments, applying the UV curable adhesive may include one or more selected from a group comprising roll coating, transfer coating, extruding, spray coating, and die coating. Exposing the UV curable adhesive to the UV light source may include exposing the UV curable adhesive to between about 100 millijoules of energy per $cm^2$ and 300 millijoules of energy per $cm^2$. The light source may include a light source that emits light in one or more selected from a group comprising a UVA wavelength, a UVB wavelength, and a UVC wavelength. The light source may include natural light. The at least partially cured first adhesive layer may be at a lower temperature than the UV curable adhesive layer during application of the UV curable adhesive layer. The method may include applying a release liner to the UV curable adhesive layer before or during compression of the polymeric roofing membrane, the first adhesive layer, and the UV curable adhesive layer.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to roofing membranes that include adhesives that enable the roofing member to remain tacky for application to roofing boards and other surfaces at lower temperatures. In particular, embodiments may include roofing membranes that remain tacky at temperatures as low as 15° F. Embodiments may include an adhesive composition that includes at least two layers of adhesive applied to a surface of the roofing membrane, with an outer adhesive layer including a UV curable adhesive that remains tacky at low temperatures. The UV curable adhesive may be applied at a low thickness, which may allow UV light to penetrate into a greater percentage of the UV curable adhesive. By using two, separately applied adhesive layers that include a thin UV curable adhesive, a high cross-linking density of between about 60% and 90% may be achieved. The adhesives used in the roofing membranes of the present invention may be fully cured during manufacturing and/or may be partially cured during manufacturing such that the adhesive may fully cure during and/or after installation of the roofing membrane. The roofing membranes of the present invention may utilize adhesives that provide high peel strengths (between five and 10 pounds per linear inch (PLI) or more) when used on conventional roofing substrate materials, such as ISO (paper and/or glass-faced polyisocyanurate boards), oriented strand board (OSB) boards, gypsum boards (which may be standard and/or faced with fiberglass), and/or other conventional roofing materials.

Figure 1A:
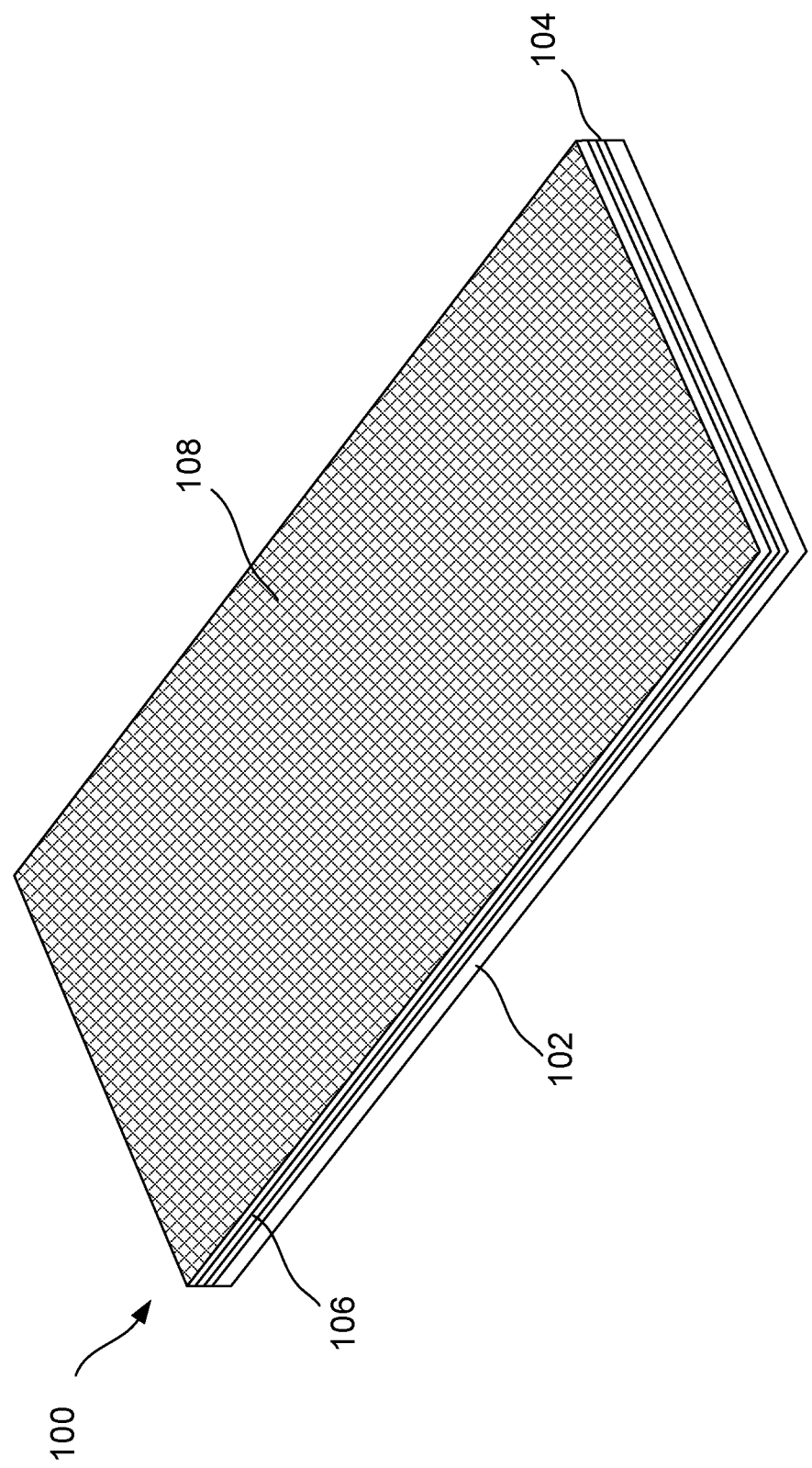
FIGS. 1A and 1B illustrate an embodiment of a roofing membrane according to embodiments of the present invention.
Figure 1B:
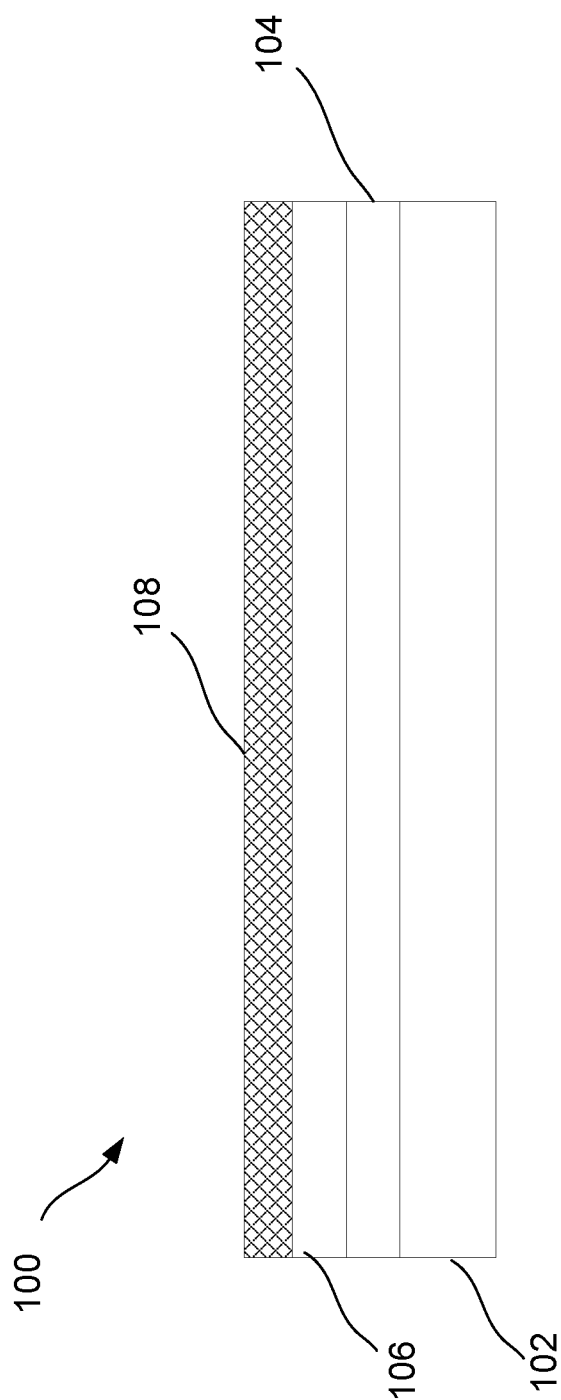

Turning now to FIGS. 1A and 1B, one embodiment of a roofing membrane 100 is illustrated. Roofing membrane 100 may be positioned atop roof structure, oftentimes above an insulation layer, and may be configured to prevent leaks in the roofing structure and/or to provide aesthetic appeal. Typically, the roofing membrane 100 may be in the form of a single ply membrane. The term "single-ply" may be used to describe a roof structure having a single application of a roofing membrane 100, but the roofing membrane 100 itself may include multiple layers. For example, the roofing membrane 100 may include polymer layers, reinforcing layers, adhesive layers, coatings, a fleece layer, and the like. It will be appreciated that in some embodiments, multiple layers of roofing membrane 100 may be applied to a single roof structure.

Oftentimes, the roofing membrane 100 may be provided as a roll of flat, flexible membrane that may be rolled out on top of the roof structure. For example, a single ply roofing membrane 100 may be supplied in any workable size (such as, but not limited to, rolls of 10 feet wide or more and containing 100 linear feet or more of roofing membrane 100). Oftentimes, the roof structure may be too large to be covered by a single piece of roofing membrane 100. In such instances, multiple pieces of roofing membrane 100 may be overlapped and joined at the seams using a waterproof joining method. For example, seams of adjacent pieces of roofing membrane 100 may be joined by priming and/or preparing edges of the roofing membranes 100 and then applying a tape to the primed and/or prepared edges, using heat welding and/or using another form of adhesive bonding. In priming or preparing the edges, the installer must wait for the primer material to flash before applying the adhesive. Improper application of the primer and/or adhesive may result in an improper bond, which may create immediate and/or long term roofing problems, such as leakage. Examples of using and installing single ply roofing membranes 100 may be found in U.S. Patent Publication No. 2016/0362894, entitled "Sheet Roofing with Pre-Taped Seams and Tape Therefor" and filed Aug. 25, 2016, the entire contents of which is hereby incorporated by reference for all purposes.

In some embodiments, roofing membrane 100 may include a polymeric membrane 102 and/or other waterproofing layer. The polymeric membrane 102 may form the outer layer of the roof once fully installed and helps prevent leaks in the roofing structure and provides aesthetic appeal to the finished roof. For example, the waterproofing layer often provides a uniform outer surface that provides an aesthetically pleasing finished appearance to the roof. Polymeric membrane 102 may have a white exterior, but may be made in various other colors or shades, such as grey, tan, black, and the like. White polymeric membranes 102 are often used to provide a pleasing appeal to the building and/or to reflect radiation and thereby minimize heat island effects. In other embodiments, a black or other dark polymeric membrane 102 may be provided. Such polymeric membranes 102 absorb more radiant heat than white polymeric membranes 102. Additionally, in the winter, condensation evaporates quicker and snow and ice melt more rapidly on black roofs than white roofs.

In some embodiments, polymeric membranes 102 may be formed of various synthetic rubber materials, modified bitumen, or thermoplastic materials. For example, roofing membrane 100 may commonly include thermoplastic polyolefin (TPO), polyvinyl chloride (PVC), ethylene propylene diene monomer (EPDM), chlorinated polyethylene (CPA), and/or modified bitumen, although some embodiments may use other thermoset and/or thermoplastic roofing membranes. In some embodiments, the polymeric membrane 102 may include one or more polymers blended with one or more fillers. For example, in some embodiments the polymeric membranes 102 may include some combination of the following materials: polypropylene, polyethylene, block copolymer polypropylene, rubber, plasticizers, fiberglass, carbon fiber, fire retardants, and the like. In another embodiment, a polymeric membranes 102 may have a more pure polymer blend without or with very few fillers. For example, the polymeric membrane 102 may include mainly polypropylene or polyethylene or some combination of these polymers with little to no fillers, although in some embodiments, these polymeric membranes 102 may include some amount of a filler, such as a fire retardant. In some embodiments, the polymeric membrane may have a thickness of between about 500 µm to about 3 mm, however other thicknesses are possible in various embodiments.

When installing the roofing membrane 100, workers must often lay out or otherwise arrange multiple flat sheets of roofing membrane 100 to the roof structure. The sheets of roofing membrane 100 are then secured to the roof structure, such as ballasting, mechanically fastening, adhesive bonding, induction welding, and/or heat welding the pieces of roofing membrane 100 to the roof structure 100. Then the workers must seal any seams formed between adjacent sheets of roofing membrane 100, such as by overlapping the adjacent edges and joining the edges at the seams using a waterproof joining method, such as using heat welding, using primer and tape, and/or other adhesive joining techniques. Additionally, workers must often install and connect electrical and/or mechanical equipment on the roof prior to the completion of the roof installation.

In some embodiments, the roofing membrane 100 may include additional layers, such as temporary protective layers that may be removed after installation of the roofing membrane 100, one or more reinforcement layers (such as scrim layers), base layers (such as fleece layers), and/or other layers.

Roofing membrane 100 may include multiple adhesive layers. For example, roofing membrane 100 may include a first adhesive layer 104 that is positioned proximate a major surface of the polymeric membrane 102 and a second adhesive layer 106 positioned atop the first adhesive layer 104. The first adhesive layer 104 may provide improved adhesion with the polymeric layer 102, and may also provide tackiness at higher temperatures (which may exceed 160° F. in some cases), while the second adhesive layer 106 may provide better peel strength and adhesion to roofing substrates (such as ISO, OSB, and/or gypsum roofing boards) and may remain tacky at temperatures as low as 15° F. In combination, the first adhesive layer 104 and second adhesive layer 106 may provide a roofing membrane 100 with strong adhesion to roofing substrates across temperature ranges that encompass both high and low environmental temperatures.

In some embodiments, the first adhesive layer 104 may include a hot melt adhesive, water-based adhesive, and/or butyl rubber-based adhesive. The first adhesive layer 104 may be applied at a thickness of between about 2 mils and 15 mils, between about 3 mils and 12 mils, between about 4 mils and 10 mils, or between about 5 mils and 8 mils. The first adhesive layer 104 may include between about 60% and 95% of a 100% cured acrylic high molecular weight hot melt adhesive with 0 to 20% rosin or terpene resin tackifier. The molecular weight of the resin may range be between about 100,000 MV/g/mol and 600,000 MV/g/mol. Examples of acrylic resins that may be used include Acrynax 11588 and/or Acrynax 11891 from Franklin Adhesives and Polymers. Additional examples of suitable acrylic resins may include Vinnapas UW 25FS and/or Vinnapas B/500/40 VL from Wacker Chemie AG. Suitable tackifiers may include Dymerex or Foral AX-E from Eastman Rosin Products.

The second adhesive layer 106 may be a UV curable adhesive, such as a UV curable acrylic adhesive. The UV curable adhesive may fully cured during manufacturing and/or may be partially cured. In embodiments in which the UV curable adhesive is only partially cured, the UV curable adhesive may be fully cured after installation by exposing the roofing membrane 100 to a UV light source, such as a UV lamp and/or natural UV light (sunlight). The UV curable adhesive may have a thickness of less than about 4 mils, less than about 3.5 mils, less than about 3 mils, less than about 2.5 mils, less than about 2 mils, less than about 1.5 mils, less than about 1 mil, or less. The thickness of the UV curable adhesive may be particularly important when the UV curable adhesive is only partially cured during manufacture, as UV energy may only penetrate 1 to 2 mils into the UV curable adhesive. Thus, thinner UV curable adhesive layers may have better cross-linking density than thicker layers.

The UV curable adhesive may include between about may include between about 45% and 80% of a UV cross-linkable acrylic resin, between about 20% and 40% of a tackifier resin, and between about 0% and 15% of a photo-initiator and/or polymerizer. The high level of tackifier within the UV curable adhesive may increase the peel strength of the roofing membrane 100. Non-limiting examples of UV cross-linkable acrylic resins that may be used include acResin® A260 and acResin® A250 produced by BASF. Non-limiting examples of tackifier resins that may be used include Kraton SYLVALITE RE 80HP Rosin Ester. Non-limiting examples of photo-initiators and/or polymerizers that may be used include benzophenone and bismaleimides.

The UV curable adhesive may have a glass transition temperature that is less than about less than about −20° C., less than about −25° C., less than about −30° C., or less. The low glass transition temperature enables the UV curable adhesive and roofing membrane 100 to remain tacky at low temperatures, such as temperatures as low as 15° F. The UV curable adhesive may exhibits a peel strength of at least 5 pounds per linear inch (PLI) when applied to conventional roofing materials, such as ISO, OSB, and gypsum roofing boards. For example, the peel strength of the UV curable adhesive may be between about 5 PLI and 15 PLI, between about 6 PLI and 12 PLI, between about 7 PLI and 9 PLI. Higher peel strengths may be achieved in some embodiments.

In some embodiments, the roofing membrane 100 may include a release liner 108 that may be provided on an external surface of the roofing membrane 100. For example, the release liner 108 may be coupled with an exposed surface of the second adhesive layer 106 to protect the adhesives of the roofing membrane 100 and to prevent the roofing membrane 100 from adhering to any surfaces prior to removal of the release liner 108 during the installation process. In some embodiments, the release liner may include a UV blocking material, such as Mylar and/or silicone-based release liners that include UV-absorbing chemicals. One example of a suitable release liner is Saint Gobain NOR-FILM. This may be particularly useful in embodiments in which the UV curable adhesive is only partially cured during the manufacturing process, as the UV blocking material may prevent the UV curable adhesive from fully curing during storage and ensures that the full cure occurs only after the release liner 108 has been removed during and/or after the installation process.

In some embodiments, the first adhesive layer 104 may include a UV curable adhesive. In such embodiments, the UV curable adhesives used in the first adhesive layer 104 and the second UV adhesive layer 106 may be the same or different. In such embodiments, the first adhesive layer 104 may have a thickness of less than about 4 mils, less than about 3.5 mils, less than about 3 mils, less than about 2.5 mils, less than about 2 mils, less than about 1.5 mils, less than about 1 mil, or less.

Figure 2:
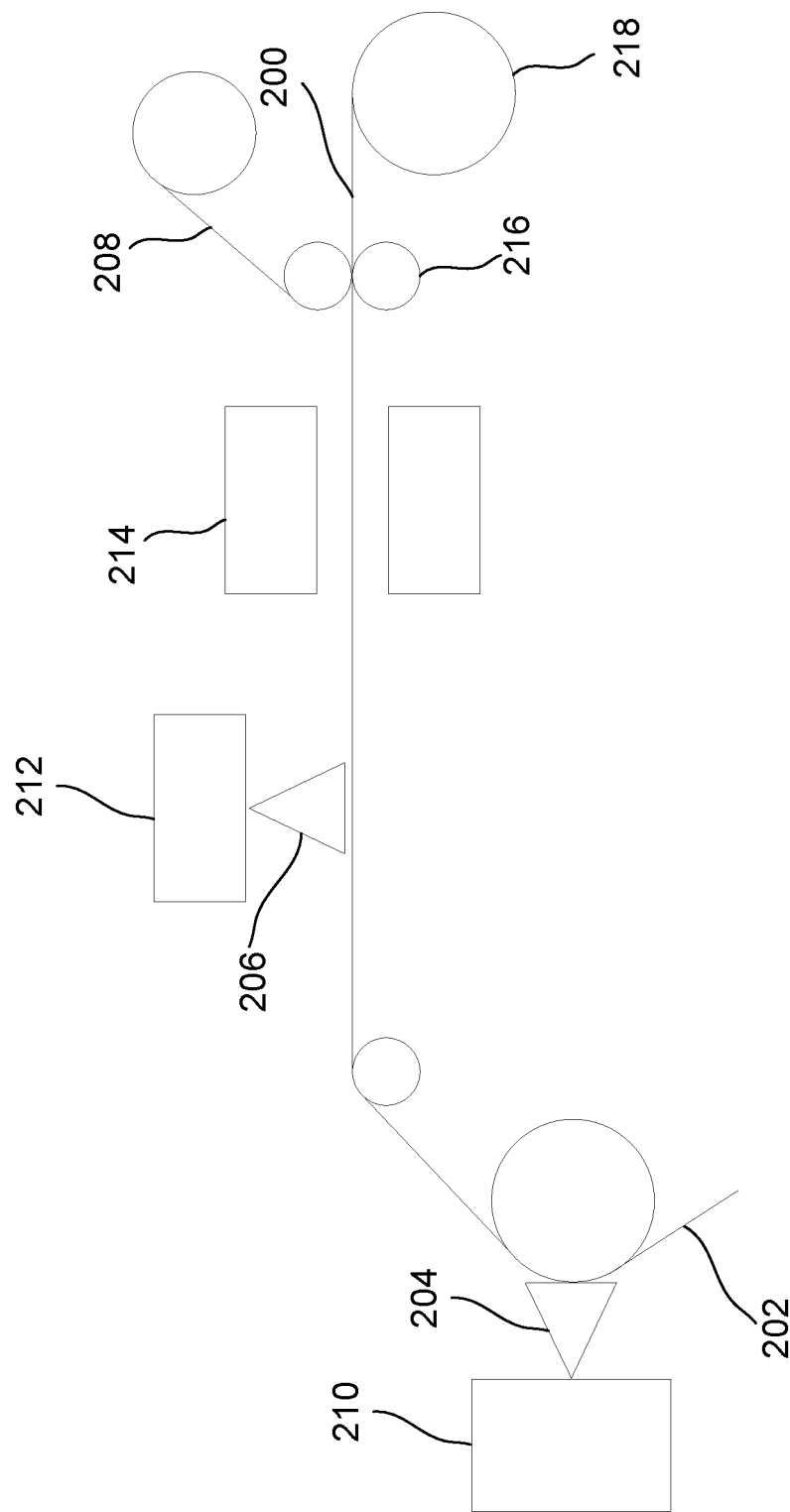
FIG. 2 illustrates a process of manufacturing a roofing membrane according to embodiments of the invention.

FIG. 2 illustrates one process of manufacturing a roofing membrane 200. The roofing membrane 200 may be similar to any of the roofing membrane 100 described above. As illustrated, a polymeric layer 202 may be provided. The polymeric layer 202 may be similar to those described elsewhere herein, and may be passed under one or more adhesive applicators 210. Adhesive applicators 210 apply a first adhesive material 204, which may be similar to the first adhesive layer 104 described elsewhere herein, to a major surface of the polymeric membrane 202. The first adhesive material 204 may be applied by the adhesive applicators 210 using transfer coating, die coating, spray coating, roll coating, and/or using other techniques to apply the first adhesive material 204 to a major surface of the polymeric membrane 202. The first adhesive material 204 may be applied at a thickness of between about 2 mils and 20 mils if water-based, butyl rubber-based, and/or a hot melt adhesive, and may be applied at a thickness of less than about 8 mils for a UV curable adhesive. In some embodiments, the first adhesive material 204 may be applied using a single pass, while in other embodiments multiple passes may be used to apply the first adhesive material 204 to a desired thickness. Pressure may be applied to the first adhesive material 204 and polymeric membrane 202 to help bond the two materials. Once applied, the first adhesive material 204 may be partially or fully cured. The curing may be active or passive. For example, in some embodiments, the first adhesive material 204 (and polymeric membrane 202) may be passed through and/or under an infrared (IR) heater, oven, microwave, and/or other heating source to dry and/or cure the first adhesive material. In some embodiments, the first adhesive material 204 may be chemically cured and/or dried. In some embodiments, the first adhesive material 204 may be dried and/or cured by exposure to air, such as by passive exposure to air and/or circulating air from a fan and/or other airflow device. In other embodiments, additional drying and/or curing steps may be provided. In some embodiments, prior to the application of the first adhesive material 204, a corona treatment may be applied to the polymeric membrane 202, following standard procedures known to the trade, to increase surface energy and improve wettability of the adhesive layers.

After curing the first adhesive material 204, a second adhesive material 206 that may include a UV curable adhesive (similar to second adhesive layer 106) may be applied using one or more additional adhesive applicators 212. For example, the second adhesive material 206 may be roll coated, spray coated, extruded, transfer coated, and/or die coated using the adhesive applicators 212. The second adhesive material 206 may be applied in one or more passes to a thickness of less than about 8 mils, less than about 7 mils, less than about 6 mils, less than about 5 mils, less than about 4 mils, less than about 3 mils, less than about 2 mils, or less. After application, the second adhesive material 206 may be at least partially cured. For example, the second adhesive material 206 (and polymeric membrane 202 and first adhesive layer 204) may be exposed to one or more UV light sources 214 and/or heat sources 216 to partially and/or fully cure the second adhesive material 206. For example, the UV light source 214 may include a UV lamp that emits light in the UVA, UVB, UVC, and/or UV visible light. In some embodiments, the light source 214 may include natural light (with or without an artificial light source). The light source 214 may apply between about 100 mj/cm$^2$ and 300 100 mj/cm$^2$ of energy to the second adhesive material 206 to cure or partially cure the second adhesive material 206. The second adhesive material 206 may be passed under the light source 216 for between about 10 seconds and 120 seconds, between about 20 seconds and 90 seconds, or between about 30 seconds and 60 seconds. The heat source 216 may include an IR heat source, an oven, microwave, and/or other heating element. The heat source 216 may expose the second adhesive material 206 to temperatures of between about 100° F. and 300° F.

The roofing membrane 200 may be fed into one or more rollers 218, which may apply pressure to compress the roofing membrane 200 to a final thickness. For example, the rollers 218 may compress the roofing membrane 200 such that the second adhesive material 206 has a thickness of less than about 4 mils, less than about 3.5 mils, less than about 3 mils, less than about 2.5 mils, less than about 2 mils, less than about 1.5 mils, less than about 1 mil, or less. The first adhesive material 204 may have a thickness of between about 2 mils and 15 mils. In some embodiments, a release liner 208 may be applied to the second adhesive material 206 before and/or as the roofing membrane 200 is compressed. The pressure from rollers 218 may help adhere the release liner 208 to the roofing membrane 200. The release liner 208 may include a UV blocking material in some embodiments.

In some embodiments, the first adhesive material 204 may be cooled prior to application of the second adhesive material 206. The first adhesive material 204 may be cooled to a temperature that is lower than the application temperature of the second adhesive material 206. For example, the first adhesive material 204 may be cooled to a temperature of between about 70° F. and 90° F. prior to applying the second adhesive material 206. The first adhesive material 204 may be actively cooled, such as using fans and/or other airflow devices, and/or may be passively cooled by exposure to air prior to applying the second adhesive material 206.

Upon completion of the formation of the roofing membrane 200, the roofing membrane 200 may be cut to desired dimensions and/or be wound onto a roll 218 for subsequent storage and/or shipment. For example the roofing membrane 200 may be cut to a width of between about 24 inches and 144 inches and a length that is specified by a customer and/or application. The final roofing membranes 200 may be installed immediately after manufacture and/or stored for later use. If stored, the roofing membranes 200 may be maintained at temperatures of less than about 160° F., which may help prevent the adhesive materials from oxidizing.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. It will be further appreciated that all testing methods described here may be based on the testing standards in use at the time of filing or those developed after filing.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of manufacturing a self-adhering roofing membrane, comprising:
    applying a first adhesive layer to a major surface of a polymeric roofing membrane;
    at least partially curing the first adhesive layer;
    applying pressure to the polymeric roofing membrane and the first adhesive layer prior to applying a UV curable adhesive layer;
    applying the UV curable adhesive layer atop the at least partially cured first adhesive layer;
    exposing the UV curable adhesive to a UV light source to at least partially cure the UV curable adhesive layer; and
    compressing the polymeric roofing membrane, the first adhesive layer, and the UV curable adhesive layer to form a self-adhering roofing membrane, wherein:
        after compression the UV curable adhesive layer has a thickness of less than about 4 mil; and
        the self-adhering roofing membrane remains tacky at a temperature of 15° F.

2. The method of manufacturing a self-adhering roofing membrane of claim 1, further comprising:
    passing the UV curable adhesive under a heat source.

3. The method of manufacturing a self-adhering roofing membrane of claim 2, wherein:
    the heat source comprises at least one of an infrared (IR) heat source, an oven, or a microwave.

4. The method of manufacturing a self-adhering roofing membrane of claim 2, wherein:
    the heat source exposes the UV curable adhesive to a temperature of between 100° F. and 300° F.

5. The method of manufacturing a self-adhering roofing membrane of claim 1, further comprising:
    applying a release liner to the UV curable adhesive layer before or during compression of the polymeric roofing membrane, the first adhesive layer, and the UV curable adhesive layer.

6. The method of manufacturing a self-adhering roofing membrane of claim 5, wherein:
    the release liner comprises a UV blocking material.

7. The method of manufacturing a self-adhering roofing membrane of claim 1, wherein:
    applying the UV curable adhesive comprises at least one of roll coating, die coating, spray coating, or transfer coating.

8. The method of manufacturing a self-adhering roofing membrane of claim 1, wherein:
    exposing the UV curable adhesive to the UV light source comprises exposing the UV curable adhesive to between about 100 millijoules of energy per cm2 and 300 millijoules of energy per cm2.

9. The method of manufacturing a self-adhering roofing membrane of claim 1, wherein:
    the UV light source comprises a light source that emits light in one or more of a UVA wavelength, a UVB wavelength, and a UVC wavelength.

10. The method of manufacturing a self-adhering roofing membrane of claim 1, wherein:
    the UV light source comprises natural light.

11. The method of manufacturing a self-adhering roofing membrane of claim 1, wherein:
    the at least partially cured first adhesive layer is at a lower temperature than the UV curable adhesive layer during application of the UV curable adhesive layer.

12. The method of manufacturing a self-adhering roofing membrane of claim 1, wherein:
    the UV curable adhesive is exposed to the UV light source for between 3 seconds and 120 seconds.

13. The method of manufacturing a self-adhering roofing membrane of claim 1, further comprising:
    applying a corona treatment to the polymeric roofing membrane prior to applying the first adhesive layer.

14. The method of manufacturing a self-adhering roofing membrane of claim 1, wherein:
    the self-adhering roofing membrane remains tacky at a temperature of 160° F.

15. The method of manufacturing a self-adhering roofing membrane of claim 1, wherein:
    the first adhesive layer comprises at least one of a hot melt adhesive, a water-based adhesive, or a butyl rubber-based adhesive.

16. The method of manufacturing a self-adhering roofing membrane of claim 1, wherein:
    the first adhesive layer is applied at a thickness of between 2 mils and 15 mils.

17. The method of manufacturing a self-adhering roofing membrane of claim 1, wherein:
    the UV curable adhesive comprises a UV curable acrylic adhesive.

18. The method of manufacturing a self-adhering roofing membrane of claim 1, wherein:
    the UV curable adhesive comprises a glass transition temperature that is less than −20° C.

19. The method of manufacturing a self-adhering roofing membrane of claim 1, wherein:
the UV curable adhesive exhibits a peel strength of at least 5 pounds per linear inch when the self-adhering roofing membrane is applied to at least one of a faced polyisocyanurate board, an oriented strand board, or a gypsum board.

20. A method of manufacturing a self-adhering roofing membrane, comprising:
applying a first adhesive layer to a major surface of a polymeric roofing membrane;
at least partially curing the first adhesive layer;
applying a UV curable adhesive layer atop the at least partially cured first adhesive layer;
passing the UV curable adhesive under a heat source;
exposing the UV curable adhesive to a UV light source to at least partially cure the UV curable adhesive layer; and
compressing the polymeric roofing membrane, the first adhesive layer, and the UV curable adhesive layer to form a self-adhering roofing membrane, wherein:
after compression the UV curable adhesive layer has a thickness of less than about 4 mil; and
the self-adhering roofing membrane remains tacky at a temperature of 15° F.

* * * * *